ated form without previously being reduced

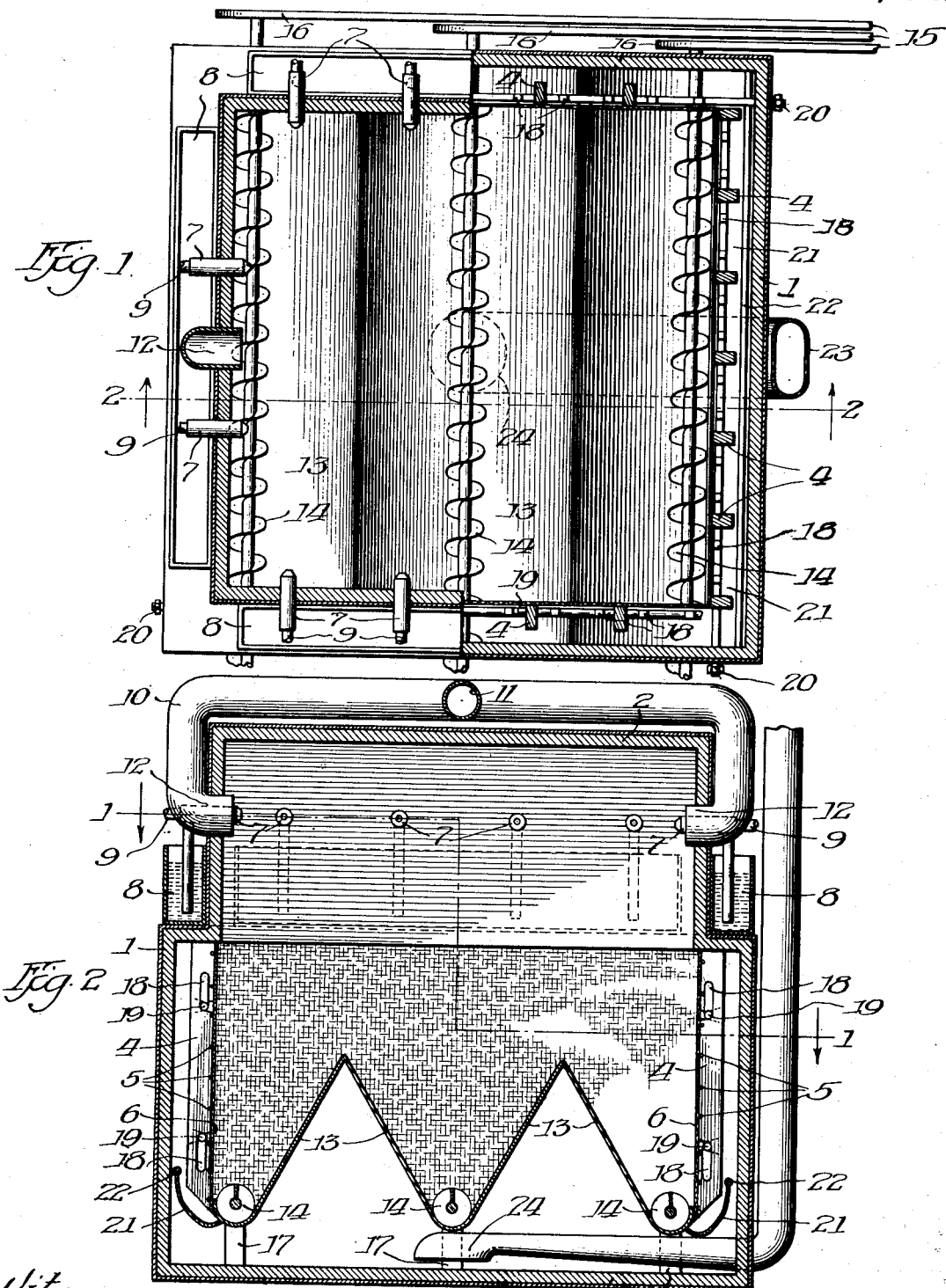

UNITED STATES PATENT OFFICE.

JOHN C. MacLACHLAN, OF CHICAGO, ILLINOIS.

DESICCATING APPARATUS.

1,259,890.     Specification of Letters Patent.     Patented Mar. 19, 1918.

Original application filed July 14, 1914, Serial No. 850,306. Divided and this application filed January 7, 1915. Serial No. 881.

*To all whom it may concern:*

Be it known that I, JOHN C. MACLACHLAN, a citizen of the United States, residing at Chicago, in the county of Cook and State of Illinois, have invented certain new and useful Improvements in Desiccating Apparatus, of which the following is a specification.

My invention relates to an improved desiccating apparatus applicable to the drying in powdered form of various liquids having solid constituents in solution, and while the apparatus may be used for the desiccating of various substances, it is particularly useful in connection with various food products, such as eggs, milk, etc. The apparatus shown and described is particularly adapted for carrying on my improved process, as shown in my co-pending application Serial No. 850,306, filed July 14, 1914, of which this is a divisional application, as it provides an effective means for not only desiccating the solution but in case of buttermilk it provides a means for preventing the over-heating of the liquid and resulting dried particles which would interfere with the production of the dried particles of flour or entirely prevent the production of said flour.

In the desiccation of buttermilk peculiar difficulty is experienced from the fact that the solution consists of whole milk with a large part of the butter fat removed. The casein is therefore still present in the solution, and any attempt to heat the solution sufficiently to evaporate the moisture and leave the solid constituents in dry form results in a coagulation of the solid constituents long before the solution reaches a sufficient temperature to effectively evaporate the moisture. This coagulated mass when dried cannot successfully be reduced to powdered form that will readily mix with water when desired to again form a buttermilk solution. By my process this difficulty is entirely avoided by taking the buttermilk and first gently heating the same to such a degree only as will slightly start the coagulation, thus producing a light, flocculent mass as a precipitate in the solution, which, however, is not sufficiently coagulated to prevent ready mixing again with the watery part of the solution if desired. After the precipitation of the light, flocculent mass, as described, the watery part of the solution is taken off and reduced in evaporating pans, preferably of the vacuum type, until the consistency of the said watery part of the solution is substantially that of the remaining solution, including the precipitated flocculent mass. The remaining solution in the evaporating pan is then mixed with the part of the solution containing the flocculent matter and stirred to make an evenly distributed mixture of the solid constituents and the remaining liquid. The resulting solution is preferably of rather thick consistency as compared with water or milk, being about the same as the consistency of thin, starchy solution used for laundry purposes. The resulting thickened solution is then placed in the tank connected with the atomizing devices of my apparatus and sprayed under high pressure into the desiccating or drying chamber. This desiccating chamber is supplied during the desiccating operation with large quantities of highly heated air, the temperature of which is sufficient to immediately vaporize the watery constituent of each atomized particle of the thickened solution, thus leaving the solid constituent part of each atomized particle in a dry condition, as a result of which the dried particle falls downward under the action of gravity to the bottom of the desiccating chamber, where it is collected and removed from the apparatus by suitable devices. A novel form of screen is employed in connection with the apparatus to prevent the passage from the apparatus of any of the flour consisting of the dried particles without interfering with the ready passage from the apparatus of the air delivered to the apparatus in highly heated condition.

While my apparatus has been described above as employed in the production of buttermilk flour, it will be understood as equally applicable to the desiccation of any similar solution; that is, any solution having a critical temperature beyond which, if the solution be heated, the solid constituent parts of the solution coagulate or partially solidify, with the result that it is impossible to subsequently dry and grind the solid portion of the solution and produce a flour that is soluble, whereas if the solid portions of the solution were dried and precipitated in atomized form, the resulting product would be soluble. My product is particularly applicable to solutions of the kind just referred to in which the solution in addition to containing solid constituents tending to coagulate by the application of heat contains also other solid constituents not affected by the application of the coagulating heat, as a result of which the remaining solution may be advantageously treated as a separate step of the process in evaporating pans, particularly if the percentage of these solid constituents is small.

The several drawings illustrating the apparatus used in connection with my invention are as follows:

Figure 1 shows the apparatus in horizontal sectional view taken along the line 1—1 of Fig. 2; and Fig. 2 shows a vertical sectional view taken along the line 2—2 of Fig. 1.

Similar numerals refer to similar parts throughout the several views.

As shown in the drawings, the apparatus consists of an inclosing casing 1, which preferably consists of a thick inner wall of insulating material, such, for example, as cork surrounded by a thinner protecting wall of stronger material, such, for example, as sheet metal. The wall 1 extends continuously on all sides of the apparatus, and the top 2 and bottom 3 of the apparatus are provided with similar inclosing walls. The lower portion of the receptacle contained within the walls 1, 2 and 3 is of greater length and breadth than the upper portion to provide for the necessary supporting devices for the screening mechanism contained within the lower part of the apparatus, as well as to provide clearance passages around the screening mechanism to permit the ready egress of the heated air from the apparatus. Within the enlargement referred to in the lower portion of the apparatus a plurality of upright supporting bars 4 is disposed, which bars extend on all four sides of the apparatus and which are preferably made of wood. These bars, however, have extending horizontally around them on their inner faces supporting wires 5, which are disposed at substantially equal distances from each other to support the fabric 6 extending around on the inner faces of the bars 4 to form the screen for permitting the heated air to pass from the apparatus without permitting the flour to pass through said screen. This screen is preferably made of canvas having a sufficiently fine weave to prevent the flour passing therethrough, without, however, preventing the passage through the fabric of the heated air. The supporting wires 5 serve to prevent the fabric from bulging outward under the pressure necessarily produced in the apparatus to force the necessary amount of air through it to properly desiccate the solution with such a rapidity as to make the apparatus effective and efficient in operation.

The upper portion of the apparatus (being that portion for which the side walls 1 are located closer together than the lower portion of the apparatus) has mounted on each of its sides a plurality of atomizers 7 supplied with the solution to be atomized from one of the tanks 8 and operated by air, either preheated or not, as desired, supplied under suitable pressure through the pipes 9. These atomizers are located preferably in the same horizontal plane as indicated, although it is not necessary that they should be so disposed.

Heated air is projected into the upper part of the casing through a pipe 10 having a supply connection 11 and two outlet openings 12 disposed opposite to each other in the side walls of the casing and located in substantially the same horizontal plane as the atomizers. While this particular disposition of the outlet openings 12 is indicated, it will be understood that other arrangements of these openings may be employed, as, for example, other numbers of discharge openings may be provided, and these openings may be disposed in different manner from that shown in the drawings. The air supplied to the pipe 10 through the opening 11 is heated to such a temperature that it will instantly dry or desiccate the atomized particles of the solution projected into the casing by the action of the atomizers 7. To force the highly heated air into the receptacle it is desirable to employ a fan or pump, but as this does not constitute an essential part of the present invention neither this nor the heating means employed is shown and described in the present application. These devices may be found in one form in my issued Patent No. 1,038,773.

The temperature of the air delivered to the casing by the pipe 10 is determined by three factors: First, the quantity of solution projected into the casing by the atomizers 7; second, the latent heat of the solution; and, third, the maximum temperature that the resulting dried or desiccated atoms will stand without injury. The effect of the latent heat of evaporation of the solution being desiccated is to cool the heated air very markedly in the zone of evaporation, as a result of which the heated air is delivered from this zone and passes to the screen at the portion of the zone where the dried or desiccated product is ready for delivery from the apparatus, and therefore, at this point the heated air must be of no higher temperature than the dried or desiccated product can safely stand. Since the quantity of solution to be desiccated determines the quantity of heat required to evaporate it for any given quantity of air supply to the apparatus per unit of time, the temperature will need to be greater as the quantity of solution projected into the apparatus by the atomizers is increased, assuming that the heated air leaves the evaporating zone at a constant temperature for the particular solution under treatment. Similarly, as the quantity of solution projected into the apparatus by the atomizers is decreased, the temperature of the given quantity of air referred to must necessarily be decreased in order to maintain the temperature of the heated air leaving the apparatus at the constant value referred to for the solution being treated. Proper and efficient operating conditions may therefore always be maintained by controlling the atomizers 7, which are provided with suitable control valves for this purpose which are not shown.

The desiccated particles resulting from the action of the apparatus descend through the apparatus in the form of very fine, light and flocculent flour upon the inclined bottom walls 13 which project upward toward the evaporating zone at acute angles to each other so as to form sharp ridges at their upper edges and so as to have a sufficient inclination to direct any of the flour falling upon them downward toward the helical conveyers 14 located at the lower edges of the walls 13 and parallel with said walls. The walls are continued around the lower surfaces of the conveyers 14 in contact with said conveyers so that the latter may operate effectively to remove the accumulated flour longitudinally of the conveyers and deliver the same from the apparatus to suitable receiving receptacles not shown, after which the flour may be packed for shipment in any desired manner. The conveyers 14 may be operated in any desired manner either by hand for small plants or by power, as indicated in Fig. 1, by means of the belts 15 extending around the pulleys 16 connected with the shafts of the conveyers. The walls 13 are supported from the bottom 3 of the apparatus by struts 17, which are provided at intervals under the conveyers 14. The edges of the walls 13 also serve to support the lower ends of the bars 4 in any suitable manner.

After continued operation of the apparatus for some time the fabric of the screen becomes more or less clogged owing to the accumulation upon it of a certain amount of the dry flour, and in order to clear the screen and at the same time save the flour a plurality of beaters 18 is provided, supported upon rods 19 extending transversely of the bars 4 and substantially parallel with the wires 5. These rods are preferably mounted on the inner edges of the bars 4 and extend through them so that the beaters 18 may be moved in semi-circles and engage the wires 5 both above and below the rods 19. As a result of the construction described, when the rods 19 are rotated by the handles 20 the wires 5 and the adjacent screen are shaken so as to jar from the screen the flour accumulated thereon. To provide against this cleaning operation being too violently accomplished as a result of which a small amount of the flour is forced through the screen and lost, I provide troughs 21, of fabric similar to the screen, below the lower edge of the screen around each of the walls of the apparatus, these troughs being supported by rods 22 extending along their upper edges. The rods 22 are disposed far enough from the inner surface of the side walls 1 so that ample clearance is left for the egress of the air which is passed through the screen, and the lower edges of the troughs are brought into contact with and may be secured to the lower edges of the outer ones of the walls 13. The troughs 21 may, if preferred, be loosely mounted so that they may be bodily removed from the apparatus for cleaning the same when desired, to accomplish which the side walls may be made wholly or in part removable. The troughs 21 being made of fabric permit the passage through them of a large quantity of the air which passes through the screen 6, and in the event of the troughs becoming clogged with the flour accumulated upon them the clearance above referred to between the rods 22 and the inner surface of the side walls 1 is ample to take care of the operation of the apparatus without any material decrease in its efficiency.

I find it desirable to provide means for sucking the air from the lower portion of the apparatus to assist in the screening operation, and to accomplish this I provide an outlet pipe 23 connected with air exhausting means of any desired type, such as a pump or fan, which pipe extends through the lower portion of one of the side walls 1 and across the bottom of the apparatus and terminates in a central downwardly extending opening 24. This construction provides for the production of a zone of sub-atmospheric pressure centrally disposed in the lower part of the apparatus, as a result of which the sides of the apparatus are affected in substantially equal degree so that the pressure of air along each side of the screen 6 is reduced substantially the same amount by the operation of the suction mechanism.

One of the advantages of the construction just described is that the screen is vertical and extends on all four sides of the apparatus substantially in the plane of the side walls of the upper portion of the apparatus, as a result of which the flour produced cannot readily accumulate in any considerable quantity upon the screen and the area of screening operation is made a maximum, with the result that the pressure exerted upon the screen by the air passing through it is correspondingly reduced, which is a desirable condition since the higher the pressure of the air upon the screen the greater is the amount of flour which is drawn through the screen by said air pressure, for it is to be understood that while it is the intention to prevent any of the flour from working through the screen this ideal condition can never be entirely accomplished, and it is necessary therefore to use every precaution to decrease this action.

It is to be borne in mind that none of the heated air passing into the apparatus leaves the same except by passing through the vertical screen 6, since the inclined walls 13 are solid, and thus the screening operation is accomplished with maximum efficiency, for where any portion of a screen is inclined so that the material screened may rest upon it to a greater or less degree, the effectiveness of the screening operation is just to that extent decreased.

Although my apparatus shown and described in the present application is peculiarly effective in carrying out my process, I do not limit its use to the desiccation of any particular kind of solution, as it may be effectively used with any solution that can be desiccated by subjecting the atomized solution to the action of highly heated air. I do not wish to be understood as limiting myself to the specific construction of apparatus described, but on the other hand I desire to claim all equivalents of the constructions specifically described which are comprehended within the knowledge of the art, and my claims are to be understood as reciting and including broadly all constructions falling generically within my invention in view of the present state of the art.

What I claim is:

1. In an apparatus for desiccating solutions, the combination of a receptacle, atomizers extending into the upper part of the receptacle, an inlet for heated air extending into the upper part of the receptacle, inclined walls above the bottom of the receptacle for receiving the atomized solids dried by the heated air, a substantially vertical screen surrounding said inclined walls, conveyers located in the lower angles of said walls for removing the dried product, and an exhaust pipe between the bottom of the receptacle and said walls for removing the heated air from the receptacle.

2. In an apparatus for desiccating solutions, the combination of a receptacle, atomizers extending into the upper part of the receptacle, an inlet for heated air extending into the upper part of the receptacle, inclined walls above the bottom of the receptacle for receiving the atomized solids dried by the heated air, a substantially vertical screen surrounding said inclined walls, conveyers located in the lower angles of said walls for removing the dried product, an exhaust pipe between the bottom of the receptacle and said walls for removing the heated air from the receptacle, flexible supports for the screen, and oscillatory beaters for engaging said supports.

3. In an apparatus for desiccating solutions, the combination of a receptacle, atomizers extending into the upper part of the receptacle, an inlet for heated air extending into the upper part of the receptacle, inclined walls above the bottom of the receptacle for receiving the atomized solids dried by the heated air, a substantially vertical screen surrounding said inclined walls, conveyers located in the lower angles of said walls for removing the dried product, an exhaust pipe between the bottom of the receptacle and said walls for removing the heated air from the receptacle, and beaters for cleaning said screen.

4. In an apparatus for desiccating solutions, the combination of a receptacle, atomizers extending into the upper part of the receptacle, an inlet for heated air extending into the upper part of the receptacle, inclined walls above the bottom of the receptacle for receiving the atomized solids dried by the heated air, a substantially vertical screen surrounding said inclined walls, conveyers located in the lower angles of said walls for removing the dried product, an exhaust pipe between the bottom of the receptacle and said walls for removing the heated air from the receptacle, beaters for cleaning said screen, and aprons along the lower edges of the screen for catching the solids collecting on the back of the screen.

5. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, and supports for the screen between the screen and the wall of the receptacle.

6. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, supports for the screen between the screen and the wall of the receptacle, and beaters mounted back of the screen to clean the same.

7. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, supports for the screen between the screen and the wall of the receptacle, beaters mounted back of the screen to clean the same, and an apron along the lower edge of the screen for receiving the dried solids collecting on the back of the screen.

8. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, and supports for the screen between the screen and the wall of the receptacle, said screen extending around the four walls of said receptacle.

9. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, said screen extending around the four walls of said receptacle, supports for the screen between the screen and the wall of the receptacle, and inclined solid walls engaging said screen for receiving the dried solid particles and directing them downward to the lower edges of said walls.

10. In a means for desiccating solutions, the combination of a receptacle having an evaporating zone in its upper portion and a separating zone in its lower portion, there being an offset in the receptacle between said two portions, a substantially vertical screen in the separating portion forming a downward continuation of the side wall of the evaporating portion of the receptacle, said screen extending around the four walls of said receptacle, supports for the screen between the screen and the wall of the receptacle, inclined solid walls engaging said screen for receiving the dried solid particles and directing them downward to the lower edges of said walls, and a suction pipe in said receptacle below said inclined walls for removing the heated air from the receptacle.

11. In a means for desiccating solutions, the combination of a receptacle for receiving the solution to be desiccated, mechanism for projecting heated air into the receptacle, an outlet for the heated air, a substantially flat screen in the receptacle disposed in the path of the heated air passing to the outlet opening, said screen disposed in a position to prevent the dried solid matter accumulating on the screen by the action of gravity, beaters for cleaning the screen, and an apron located along the lower edge of the screen for receiving the particles of solid matter accumulating on the back of the screen.

12. In a means for desiccating solutions, the combination of a receptacle for receiving the solution to be desiccated, mechanism for projecting heated air into the receptacle, an outlet for the heated air, and a screen in the receptacle disposed in the path of the heated air passing to the outlet opening, said screen disposed in a position to prevent the dried solid matter accumulating on the screen by the action of gravity and said screen extending entirely around the receptacle.

13. In a means for desiccating solutions, the combination of a receptacle for receiving the solution to be desiccated, mechanism for projecting heated air into the receptacle, an outlet for the heated air, a screen in the receptacle disposed in the path of the heated air passing to the outlet opening, said screen disposed in a position to prevent the dried solid matter accumulating on the screen by the action of gravity and said screen extending entirely around the receptacle, and a bottom wall engaging the lower edge of the screen to receive upon it the dried solid particles.

14. In a means for desiccating solutions, the combination of a receptacle for receiving the solution to be desiccated, mechanism for projecting heated air into the receptacle, an outlet for the heated air, a screen in the receptacle disposed in the path of the heated air passing to the outlet opening, said screen disposed in a position to prevent the dried solid matter accumulating on the screen by the action of gravity and said screen extending entirely around the receptacle, and a bottom wall engaging the lower edge of the screen to receive upon it the dried solid particles, said bottom wall consisting of a plurality of upwardly extending oblique surfaces for directing the solid particles toward the lower portions of these surfaces.

15. In a means for desiccating solutions, the combination of a receptacle for receiving the solution to be desiccated, mechanism for projecting heated air into the receptacle, an outlet for the heated air, a screen in the receptacle disposed in the path of the heated air passing to the outlet opening, said screen disposed in a position to prevent the dried solid matter accumulating on the screen by the action of gravity and said screen extending entirely around the receptacle, a bottom wall engaging the lower edge of the screen to receive upon it the dried solid particles, said bottom wall consisting of a plurality of upwardly extending oblique surfaces for directing the solid particles toward the lower portions of these surfaces, and conveyers adjacent to the lower portions of the surfaces for removing the solid particles from the receptacle.

16. In a means for desiccating solutions, the combination of a receptacle for receiving the solution to be desiccated, mechanism for projecting heated air into the receptacle, an outlet for the heated air, a screen in the receptacle disposed in the path of the heated air passing to the outlet opening, said screen disposed in a position to prevent the dried solid matter accumulating on the screen by the action of gravity and said screen extending entirely around the receptacle, and a bottom wall engaging the lower edge of the screen to receive upon it the dried solid particles, said bottom wall consisting of a plurality of upwardly extending oblique surfaces for directing the solid particles toward the lower portions of these surfaces, said outlet opening for the heated air being centrally disposed in the receptacle below said bottom wall and opening downward.

17. In a means for desiccating solutions, the combination of a receptacle for receiving the solution to be desiccated, mechanism for projecting heated air into the receptacle, an outlet for the heated air, a screen in the receptacle disposed in the path of the heated air passing to the outlet opening, said screen disposed in a position to prevent the dried solid matter accumulating on the screen by the action of gravity and said screen extending entirely around the receptacle, a bottom wall engaging the lower edge of the screen to receive upon it the dried solid particles, said bottom wall consisting of a plurality of upwardly extending oblique surfaces for directing the solid particles toward the lower portions of these surfaces, and conveyers adjacent to the lower portions of the surfaces for removing the solid particles from the receptacle, said outlet opening for the heated air being centrally disposed in the receptacle below said bottom wall and opening downward.

In witness whereof, I hereunto subscribe my name this 28th day of December, A. D. 1914.

JOHN C. MacLACHLAN.

Witnesses:
   ALBERT C. BELL,
   L. E. HANNEN.